(12) United States Patent  
Misbach

(10) Patent No.: US 7,725,670 B2
(45) Date of Patent: May 25, 2010

(54) SYSTEM AND METHOD OF IMAGING A MEMORY MODULE WHILE IN FUNCTIONAL OPERATION

(75) Inventor: Matthew A. Misbach, Orem, UT (US)

(73) Assignee: Novell, Inc., Provo, UT (US)

( * ) Notice: Subject to any disclaimer, the term of this patent is extended or adjusted under 35 U.S.C. 154(b) by 832 days.

(21) Appl. No.: 11/540,511

(22) Filed: Oct. 2, 2006

(65) Prior Publication Data

US 2008/0155211 A1    Jun. 26, 2008

(51) Int. Cl.
*G06F 12/16* (2006.01)

(52) U.S. Cl. ............................. 711/162; 711/E12.103; 707/204

(58) Field of Classification Search .................. None
See application file for complete search history.

(56) References Cited

U.S. PATENT DOCUMENTS

2003/0212869 A1* 11/2003 Burkey ...................... 711/162

2006/0248041 A1* 11/2006 Stevenson ..................... 707/1
2008/0183775 A1*  7/2008 Prahlad et al. .............. 707/204

\* cited by examiner

*Primary Examiner*—Denise Tran
(74) *Attorney, Agent, or Firm*—Pillsbury Winthrop Shaw Pittman LLP

(57) ABSTRACT

A memory module (e.g. a hard drive, an optical drive, a flash drive, etc.) associated with a computer system may be imaged without substantial interruption to the operation of the overall system. The imaging may include applying an image to the memory module while execution of one or more operations and/or algorithms that require at least intermittent access to information stored initially in the memory module is ongoing. This may enable a system associated with the memory module to continue with normal, or substantially normal, operation while the image is being applied to the memory module. The image applied to the memory module may, for example, update the system, restore the system to a previous state (e.g., to its state at a previous point in time), or otherwise modify the system with which it is associated.

18 Claims, 3 Drawing Sheets

REPLACEMENT SHEET

```
┌─────────────────────────────────────────────────────────────┐
│ SYNCHRONIZE A SECONDARY MEMORY MODULE TO THE PRIMARY MEMORY │
│ MODULE WHILE THE ONE OR MORE OPERATIONS AND/OR ALGORITHMS ARE│
│                      BEING EXECUTED                          │
└─────────────────────────────────────────────────────────────┘
                              │  ──── 46
                              ▼
┌─────────────────────────────────────────────────────┐ ─ 48
│ ADJUST THE FILE SYSTEM SUCH THAT THE PRIMARY MOUNT  │
│ POINT POINTS TO THE SECONDARY MEMORY MODULE SO THAT │
│ THE ONGOING EXECUTION OF THE ONE OR MORE OPERATIONS │
│ AND/OR ALGORITHMS WILL ACCESS THE INFORMATION STORED│
│          IN THE SECONDARY MEMORY MODULE DURING      │
│       SYNCHRONIZATION OF THE SECONDARY MEMORY MODULE│
└─────────────────────────────────────────────────────┘
                              │  ─ 50           ─ 44
                              ▼
┌──────────────────────────────┐      ┌────────────────────┐
│  APPLY AN IMAGE TO THE PRIMARY│      │  MOUNT SECONDARY   │
│  MEMORY MODULE WHILE THE PRIMARY│◄───│   MEMORY MODULE    │
│    MOUNT POINT POINTS TO THE  │      │                    │
│      SECONDARY MEMORY MODULE  │      └────────────────────┘
└──────────────────────────────┘
                              │  ─ 52
                              ▼
┌─────────────────────────────────────────────────────┐
│ ADJUST THE FILE SYSTEM SUCH THAT THE PRIMARY MOUNT  │
│ POINT POINTS TO THE PRIMARY MEMORY MODULE SO THAT THE│
│ ONGOING EXECUTION NOF THE ONE OR MORE OPERATIONS AND/│
│ OR ALGORITHMS WILL ACCESS THE INFORMATION IN THE    │
│ PRIMARY MEMORY MODULE DURING THE APPLICATION OF THE │
│           IMAGE TO THE PRIMARY MEMORY MODULE        │
└─────────────────────────────────────────────────────┘
```

SYSTEM AND METHOD OF IMAGING A MEMORY MODULE WHILE IN FUNCTIONAL OPERATION

FIELD OF THE INVENTION

The invention relates to imaging a memory module while execution of one or more operations and/or algorithms that require at least intermittent access to information stored initially in the memory module is ongoing.

BACKGROUND OF THE INVENTION

For a variety of reasons, a hard drive of a computer system may be imaged and/or cloned. Imaging may include applying an image to the hard drive. In some instances, the image being applied may include an image of the hard drive taken at a previous point in time and being applied to the hard drive to restore the hard drive to a previous state. Generally, the application of an image to a hard drive may require a substantially stoppage or delay of operation. For example, the application of an image to a hard drive may require a system reboot, an application and/or operating system restart, a log-off, a shut down, and/or other stoppages or delays of operation. These stoppages and/or delays of operation may be time-consuming, inefficient, and/or otherwise inconvenient or unsatisfactory.

SUMMARY

One aspect of the invention relates to imaging a memory module (e.g. a hard drive, an optical drive, a flash drive, etc.) associated with a computer system. The imaging may include applying an image to the memory module while execution of one or more operations and/or algorithms that require at least intermittent access to information stored initially in the memory module is ongoing. This may enable a system associated with the memory module to continue with normal, or substantially normal, operation while the image is being applied to the memory module. In other words, the application of the image to the memory module may take place with out substantial stoppages and/or delays to the operation of the system such as a system reboot, an application and/or operating system restart, a log-off, a shut down, and/or other stoppages or delays of operation. The image applied to the memory module may, for example, update the system, restore the system to a previous state (e.g., to its state at a previous point in time), or otherwise modify the system with which it is associated.

In some embodiments of the invention, a system may include a primary memory module, a secondary memory module and a processor. During operation, the processor may execute one or more algorithms and/or operations. The execution of the one or more algorithms and/or operations may require the processor to access information stored initially in the primary memory module. The information may be access by the processor from the primary memory module at a primary mount point in a file system associated with the system. One feature provided by the system may be that an image may be applied to the primary memory module in a manner that is transparent, or relatively transparent to one or more users of the system. For example, the system may enable an image to be applied to the primary memory module while the processor continues to execute the one or more algorithms and/or operations. In some instances, the application of the image to the primary memory module by the system may be executed without rebooting the system (or components included therein), or requiring other stoppages or delays of operation.

The processor, in addition to performing the ongoing performance of the one or more operations and/or algorithms, may include a synchronization module, a directory management module, an imaging module, and/or one or more other modules. The synchronization module may synchronize the secondary memory module to the primary memory while the processor continues to execute the one or more operations and/or algorithms. The directory management module adjusts the file system associated with the system so that the primary mount point points to the secondary memory module (after synchronization) instead of the primary memory module. Thus, the processor accesses information stored in the secondary memory module at the primary mount point, rather than in the primary memory module, during the ongoing execution of the one or more operations and/or algorithms. While the primary mount point points to the secondary memory module, the imaging module applies the image to the primary image module. Once the image has been applied to the primary memory module, the directory management module remounts the primary memory module to the system by adjusting the file system so that the primary mount point once again points to the (newly imaged) primary memory module. This adjustment is performed without substantial interruption to the one or more processes and/or algorithms being performed by the processor.

In some implementations, the image applied to the primary memory module by the imaging module includes an image of the primary memory module that has been taken at a previous point in time. This may restore the primary memory module to a previous state. The image may have been taken by the imaging module at the previous point in time.

BRIEF DESCRIPTION OF THE DRAWINGS

FIG. 3 illustrates a method of applying an image to a memory module, according to one or more embodiments of the invention.

DETAILED DESCRIPTION

Figure 1:
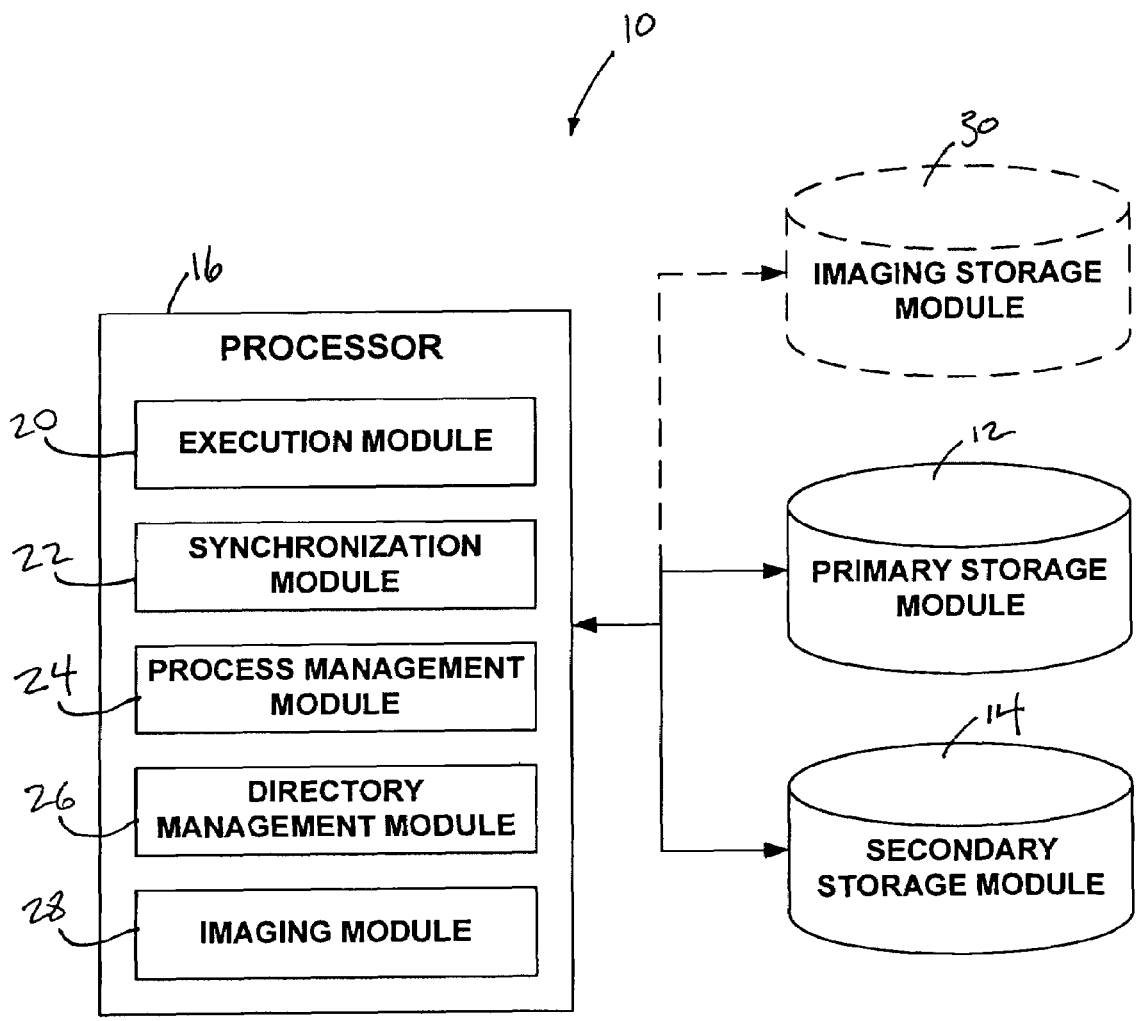
FIG. 1 illustrates a system 10 configured to image a memory module, according to one or more embodiments of the invention.

FIG. 1 illustrates a system 10 configured to image a memory module. In some embodiments, system 10 comprises a primary memory module 12, a secondary memory module 14, a processor 16, and/or other components. During operation, processor 16 may execute one or more algorithms and/or operations. The execution of the one or more algorithms and/or operations may require processor 16 to access information stored initially in primary memory module 12. One feature provided by system 10 may be that an image may be applied to primary memory module 12 in a manner that is transparent, or relatively transparent to one or more users of system 10. For example, system 10 may enable an image to be applied to primary memory module 12 while processor 16 continues to execute the one or more algorithms and/or operations. In some instances, the application of the image to primary memory module 12 by system 10 may be executed without rebooting system 10 (or components included therein).

Primary memory module 12 may include an electronically readable storage medium that stores information related to (1) the one or more operations and/or algorithms being executed by processor 16 and/or (2) overall organization and operation of system 10. For example, in some implementations, primary memory module 12 may include a non-volatile memory associated with a computer terminal (e.g., a desktop personal computer, a laptop personal computer, a server, etc.). In other implementations, primary memory module 12 may include a non-volatile memory associated with other electronic systems (e.g., a PDA, a mobile phone, a camera, an portable music player, etc.). The non-volatile memory may include a magnetic memory (e.g., a hard disk drive, a floppy disk, etc.), an optical memory, a flash memory, and/or other types of memory.

The information stored by primary memory module 12 may include information related to the operation of processor 16 and/or information related to one or more operations and/or algorithms to be executed by processor 16. For example, primary memory module 12 may include information related to one or more software programs. One such example may include information related to an operating system being executed by system 10 (e.g., one or more kernel modules, a local file system, a configuration file, a driver, etc.). Another such example may include information related to one or more applications that system 10 is capable of executing (e.g., application files, a configuration file, a driver, etc.).

Secondary memory module 14 may include an electronically readable storage medium that enables information to be stored in and read from secondary memory module 14. The electronically readable storage medium may include a volatile medium or a non-volatile medium. For instance, the electronically readable storage medium may include a magnetic storage medium, an optical storage medium, a flash storage medium, a static electronic storage medium (e.g., that stores information via capacitive charge), a dynamic electronic storage medium (e.g., that stores information via a digital flip-flop), and/or other electronically readable storage media. In some implementations, secondary memory module 14 may include Random Access Memory ("RAM").

Processor 16 may include one or more processing units capable of interpreting instructions and/or processing data contained in computer software programs. It should be appreciated that although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. In instances in which a plurality of devices are implemented, operative communications links may be formed between the devices to enable communication and coordination therebetween.

For example, in some embodiments, processor 16 may include one or more processors external to system 10 (e.g., a computer that communicates with system 10 to image primary memory module 12), one or more processors that are included integrally in one or more of the components of system 10, or both. Processors external to system 10 may, in some cases, provide redundant processing to the processors that are integrated with components in system 10, and/or the external processor may provide additional processing and/or information to enable an image to be applied to primary memory module 12.

Primary memory module 12, secondary memory module 14, and processor 16 may be configured for operative communication therebetween. This operative communication may be implemented via one or more communication links that enable information to be exchanged between these components of system 10. For example, the one or more communication links may include a wireless link, a hard wired link, a discrete connection, a connection implemented via network, and/or other communication links.

As is shown in FIG. 1, in some embodiments, processor 16 may include a process execution module 20, a synchronization module 22, a process management module 24, a directory management module 26, an imaging module 28, and/or one or more other modules. Modules 20, 22, 24, 26, and 28 may be implemented in software; hardware; firmware; some combination of software, hardware, and/or firmware; and/or otherwise implemented. It should be appreciated that although modules 20, 22, 24, 26, and 28 are illustrated in FIG. 1 as being co-located within a single processing unit, in implementations in which processor 16 includes multiple processing units, modules 20, 22, 24, 26, and/or 28 may be located remotely from the other modules and operative communication between modules 20, 22, 24, 26, and/or 26 may be achieved via one or more communication links. Such communication links may be wireless or hard wired.

Process execution module 20 may execute operations and/or algorithms associated with one or more software processes being run by processor 16. The software processes being run by processor 16 may include application software, system software, embedded software, and/or other software processes. In executing the operations and/or algorithms, process execution module 20 may access information stored in primary storage module 12. For example, process execution module 20 may access software code (e.g., an operating system kernel, an application file, etc.), one or more file systems (e.g., a local file system of an individual terminal, a root file system of a network, etc.), a configuration file, a driver, a data file that can be manipulated via an application, and/or other information.

Synchronization module 22 may synchronize secondary memory module 14 to primary memory module 12 while process execution module 20 accesses (at least intermittently) primary memory module 12 to execute the one or more operations and/or algorithms dictated by the software being run. Synchronizing secondary memory module 14 to primary memory module 12 may include causing a copy of the information stored on primary memory module 12 that is being used by process execution module 20 to execute the one or more operations and/or algorithms to be stored in secondary memory module 14. For example, this information may include data being worked on by the one or more software processes being run, one or more operating system kernel modules, one or more drivers, and/or other information.

In some instances, reducing the number of processes being run on processor 16 may facilitate one or more steps in the imaging of primary memory module 12. Accordingly, process management module 24 may manage the processes being run on processor 16 before, during, and/or after the imaging of primary memory module 12. In some embodiments, process management module 24 may terminate execution of one or more processes, close one or more open files, and/or otherwise reduce the amount of information being accessed in primary memory module 12 and/or the amount of processing being performed by processor 16. For example, one or more open application processes may be gracefully shut down. This may include prompting a user (e.g., an administrator, a client computer user, etc.) to inquire if one or more processes may be shut down, and upon receiving an affirmative response, shutting the processes down.

According to various implementations, process management module 24 may determine which processes and/or files to close based on one or more predetermined rules. These rules may include an amount of time that an application and/or file has been idle (e.g., so that "unused" files and/or applications are closed), an application and/or file priority, and/or other rules. In some implementations, one or more of the rules may be predetermined according to one or more user-selectable settings. In some implementations, one or more of the rules may be predetermined according to one or more machine specific and/or software specific (e.g., operating system specific, firmware specific, etc.) settings.

Directory management module 26 may manage one or more file systems associated with system 10. For example, in some of the embodiments in which processor 16 represents a plurality of networked machines providing processing functionality, directory management module 26 may manage at least a portion of a directory of a root file system associated the plurality of networked machines. In these embodiments, directory management module 26 may manage a directory of a file system associated with a single machine on which process execution module 20 is operating to execute one or more operations and/or algorithms which require information stored in primary memory module 12 to be accessed. In some cases, the file system associated with the single machine may form a portion of the file system associated with the plurality of machines.

In some implementations, primary memory module 12 may be mounted to one or more of the file systems managed by directory management module 26 at a primary mount point in one or more file system directories that correspond to the one or more file systems. This may enable processor 16 (e.g., process execution module 20) to access information stored in primary memory module 12 at the primary mount point. In preparation for the imaging of primary memory module 12 (and/or for some other purpose) directory management module 26 may mount secondary memory module 14 to the file system directory at a secondary mount point. This may enable processor 16 to access secondary memory module 14 (e.g., to store information thereon, to access information stored thereon, etc.) in the file system at the secondary mount point.

In some instances, primary memory module 12 and secondary memory module 14 may be configured to exchange information directly therebetween within the file system managed by directory management module 26. For example, memory modules 12 and 14 may exchange information via Direct Memory Access ("DMA"). Direct exchanges of information between primary memory module 12 and secondary memory module 14 (e.g. from the primary mount point to the secondary mount point within the file system) may be controlled and/or monitored by processor 16 (e.g., by synchronization module 22 to provide information stored within primary memory module 12 to secondary memory module 14).

In some implementations, once synchronization module 22 has synchronized secondary memory module 14 to primary memory module 12, and process management module 24 has closed and/or shut down superfluous processes and/or files, directory management module 25 may adjust one or more of the file systems associated with system 10 such that the primary mount point points to secondary memory module 14 rather than primary memory module 12. This may enable processor 16 (e.g., process execution module 20) to continue to execute one or more operations and/or algorithms by accessing information at the primary mount point. However, instead of accessing information stored in primary memory module 12, the information accessed by processor 16 at the primary mount point may be stored in secondary memory module 14. Directory management module 26 may make this adjustment to the file system(s) in such a manner that enables the execution of the one or more processes and/or algorithms by processor 16 to be ongoing while the adjustment is made.

By adjusting the file system(s) so that the primary mount point points to secondary memory module 14, directory management module 26 may be effectively decoupling, or unmounting, primary memory module 12 from system 10 for the purpose of enabling execution of operations and/or algorithms by processor 16. While primary memory module 12 is thus unmounted, imaging module 28 may apply an image to primary memory module 12, as is discussed below. Once primary memory module 12 has been imaged, directory management module 26 may remount primary memory module 12 by adjusting the file system(s) associated with system 10 such that once again the primary mount point in the one or more file system directories point to primary memory module 12. As with the unmounting of primary memory module 12, this remounting of primary memory module 12 to the file system(s) for the purpose of enabling execution of operations and/or algorithms by processor 16 may be accomplished by directory management module 26 without substantially interrupting the execution of the one or more operations and/or algorithms by processor 16.

Imaging module 28 may apply an image to primary memory module 12. The image may include a previously recorded image of a memory module. For example, in some implementations, imaging module 28 may be capable of taking an image of primary memory module 12, and the image that imaging module 28 applies to primary memory module 12 may include an image of primary memory module 12 at a previous point in time. In this manner, imaging module 28 may return primary memory module 12 to a previous state. In some instances, imaging module 28 may take images of primary memory module 12 at predetermined intervals. In some instances, imaging module 28 may take the image of primary memory module 12 upon receipt of an input from a user.

Images taken by imaging module 28 and/or applied to primary memory module 12 by imaging module 28 may be stored in an imaging memory module 30. Imaging memory module 30 may include a non-volatile memory. The non-volatile memory may include a magnetic memory (e.g., a hard disk drive, a floppy disk, etc.), an optical memory, a flash memory, and/or other types of memory. In some implementations, imaging memory module 30 may be local to primary memory module 12. For example, both memory modules 12 and 30 may be formed as separate partitions on the same electronically readable storage medium (e.g., partitions on a common hard drive). In other implementations, imaging memory module 30 may be remotely located with respect to primary memory module 12.

The application of an image stored on imaging memory module 30 to primary memory module 12 by imaging module 28 may include a data transfer accomplished via DMA, or by a less direct technique. The image may be applied to primary memory module 12 by recording the image over some or all of the information stored in primary memory module 12 (e.g., as a destructive process). Imaging module 28 may take an image of primary memory module 12 by causing a copy of the information stored in primary memory module 12 to be stored in imaging memory module 30. This information may be transferred from primary memory module 12 to imaging memory module 30 via DMA, or by a less direct technique.

Figure 2:
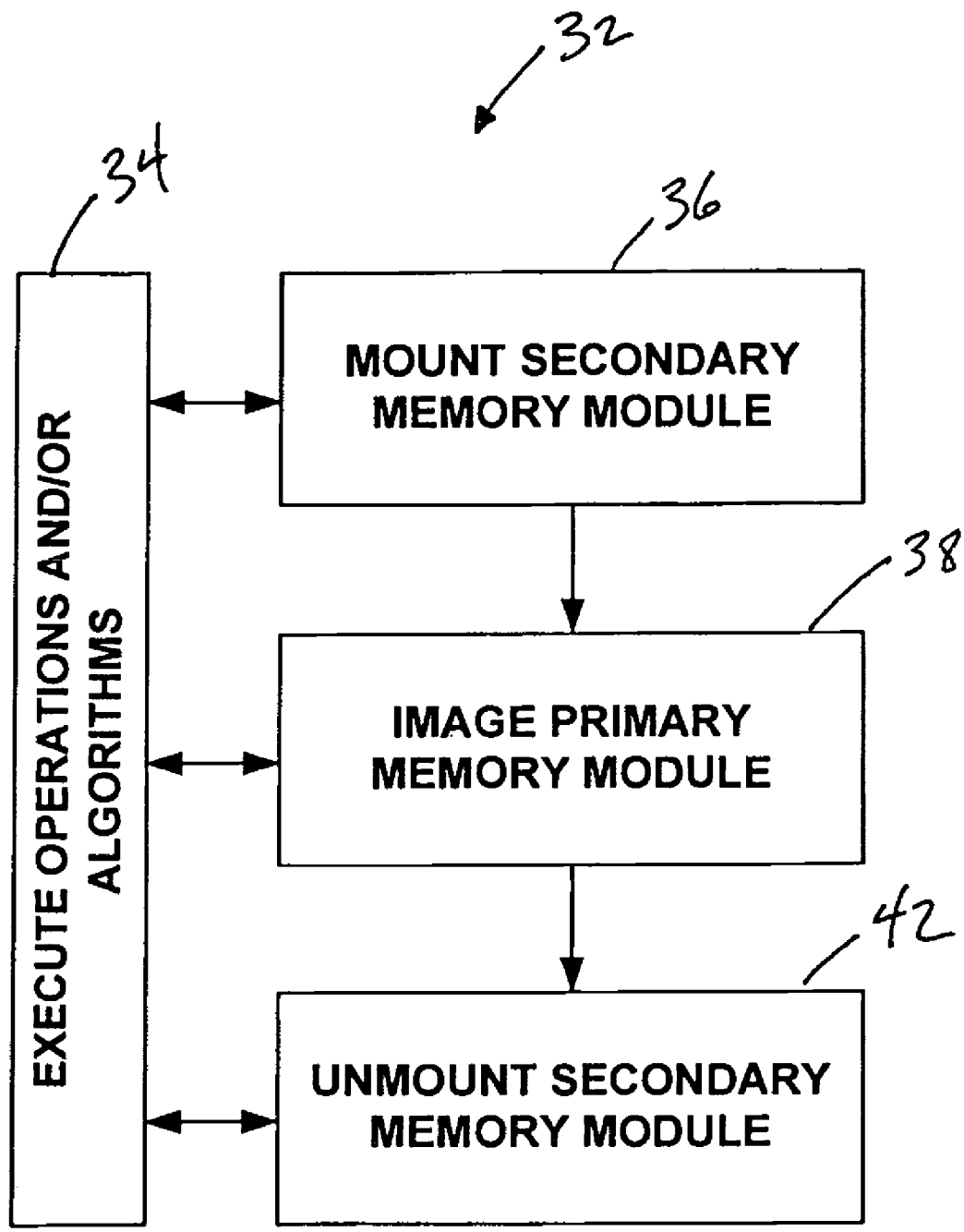
FIG. 2 illustrates a method of imaging a memory module, in accordance with one or more embodiments of the invention.

FIG. 2 illustrates a method 32 of applying an image to a primary memory module in a substantially transparent and continuous manner. In some implementations, the operations of method 32 are executable by the components of system 10 (e.g., shown in FIG. 1 and described above), as is discussed hereafter. However, it should be appreciated that this is not intended to be limiting, as other systems capable of executing the operations of method 32 exist within the scope of this disclosure.

Element 34 in FIG. 2 represents the ongoing execution of one or more operations and/or algorithms, wherein executing the one or more operations and/or algorithms comprises at least intermittently accessing information at a primary mount point in a file system that initially points to the primary memory module, which initially stores the information being accessed. As can be seen in FIG. 2, in some implementations, the execution of the one or more operation and/or algorithms may be ongoing throughout method 32 without significant stoppage (e.g., a logoff, a shut down of an operating system, a restart of an application and/or operating system, a reboot of a system, etc.). In one embodiment, element 34 represents the ongoing execution of one or more operations and/or algorithms associated with one or more processes being executed by process execution module 20 of processor 16 (e.g., shown in FIG. 1 and described above).

Method 32 includes a step 36, at which a secondary memory module is mounted to the file system at a secondary mount point. In some implementations, the secondary memory module may include secondary memory module 14 (e.g., shown in FIG. 1 and described above). In some implementations, the secondary memory module may be mounted to the file system by directory management module 26 (e.g., shown in FIG. 1 and described above).

At a step 38, the primary memory module may be imaged while the execution of the one or more operations and/or algorithms represented by element 34 is ongoing. In some implementations, step 38 may include executing method 40, illustrated in FIG. 3 and described below.

Returning to FIG. 2, at a step 42 in method 32, the secondary memory module may be unmounted from the file system. In some implementations, step 42 may be performed by directory management module 26 (e.g., shown in FIG. 1 and described above).

As was mentioned above, FIG. 3 illustrates method 40 of imaging a primary memory module while the execution of one or more operations and/or algorithms that require access to information stored in the primary memory module are ongoing. In some implementations, the operations of method 40 are executable by the components of system 10 (e.g., shown in FIG. 1 and described above), as is discussed hereafter. However, it should be appreciated that this is not intended to be limiting, as other systems capable of executing the operations of method 40 exist within the scope of this disclosure.

Method 40 may include a step 44, at which an image of the primary memory module is taken. In some implementations, step 44 may be performed by imaging module 28 of system 10 (e.g., shown in FIG. 1 and described above).

Method 40 may include a step 46, at which a secondary memory module is synchronized with the primary memory module. In some implementations, step 46 may be executed by synchronization module 22 with respect to primary memory module 12 and secondary memory module 14 of system 10 (e.g., shown in FIG. 1 and described above).

At a step 48, a file system in which the primary memory module is mounted at a primary mount point is adjusted. The adjustment of the file system of step 46 may include adjusting the file system such that the primary mount point that previously pointed to the primary memory module instead points to the secondary memory module. This adjustment of the file system may be conducted in a relatively transparent and continuous manner such that the execution of the one or more operations and/or algorithms that require access to the information initially stored on the primary memory module may be ongoing throughout the adjustment. In some implementations, step 48 may be performed by directory management module 26 of system 10 (e.g., shown in FIG. 1 and described above).

At a step 50, an image may be applied to the primary memory module while the primary mount point points to the secondary memory module. The image applied to the primary memory module 50 may include an image of the primary memory module taken at a previous point in time (e.g., at step 44). In some implementations, step 50 may be executed by imaging module 28 of system 10 (e.g., shown in FIG. 1 and described above).

At a step 52, the file system may be adjusted, subsequent to the application of the image to the primary memory module, such that the primary mount point once again points to the primary memory module. This may enable the ongoing execution of the one or more operations and/or algorithms to access information stored in the primary memory module at the primary mount point. As was the case with the adjustment of the file system at step 48, in some cases this adjustment of the file system may be conducted in a relatively transparent and continuous manner such that the execution of the one or more operations and/or algorithms may be ongoing throughout the adjustment. In some implementations, step 52 may be executed by directory management module 26 of system 10 This adjustment of the file system may be conducted in a relatively transparent and continuous manner such that the execution of the one or more operations and/or algorithms that require access to the information initially stored on the primary memory module may be ongoing throughout the adjustment.

Thus, the subject matter of this application has been described in conjunction with the specific embodiments outlined above, it is evident that many alternatives, modifications and variations will be apparent to those skilled in the art. Accordingly, the preferred embodiments as set forth above are intended to be illustrative, not limiting. Various changes may be made without departing from the spirit and scope of the following claims.

What is claimed is:

1. A system comprising:
 a processor configured to execute one or more operations and/or algorithms;
 a primary memory module that is accessible to the processor at a primary mount point in a file system directory associated with the system, the primary memory module storing information that the processor accesses in order to execute the one or more operations and/or algorithms;
 a secondary memory module that is mounted to the file system directory associated with the system at a secondary mount point;
 a synchronization module configured to synchronize the secondary memory module to the primary memory module while the processor executes the one or more operations and/or algorithms;
 a directory management module configured to cause the primary mount point in the file system directory to point to the secondary memory module while the processor executes the one or more operations and/or algorithms; and an imaging module configured to apply an image to the primary memory module while the primary mount point in the file system directory points to the secondary memory module;

the directory management module being further configured to remount the primary memory module to the file system directory after imaging by causing the primary mount point to once again point to the primary memory module.

2. The system of claim 1, wherein the synchronization module synchronizes the secondary memory module to the primary memory module by causing a copy of the information that is stored in the primary memory module and used by the processor to execute the one or more operations and/or algorithms to be stored in the secondary memory module.

3. The system of claim 2, wherein the information that is stored in the secondary memory module comprises one or more of a software kernel module, a driver, or a configuration file.

4. The system of claim 1, wherein the imaging module applies the image to the primary memory module by recording information associated with the image over information already stored in the primary memory module module.

5. The system of claim 1, wherein the primary memory module comprises a hard drive.

6. The system of claim 1, wherein the secondary memory module comprises RAM.

7. The system of claim 1, wherein the imaging module is further configured to take an image of the primary memory module.

8. The system of claim 7, wherein the image applied to the primary memory module comprises an image of the primary memory module taken by the imaging module at a previous point in time.

9. A method of applying an image to a primary memory module, the method comprising:

executing one or more operations and/or algorithms, wherein executing one or more operations and/or algorithms comprises at least intermittently accessing information at a primary mount point in a file system, and wherein the primary memory module is initially mounted in the file system at the primary mount point information and initially stores the information to be accessed; and imaging the primary memory module while the execution of the one or more operations and/or algorithms is ongoing, wherein imaging the primary memory module comprises:

synchronizing a secondary memory module to the primary memory module while the one or more operations and/or algorithms are being executed;

adjusting the file system such that the primary mount point points to the secondary module so that the ongoing execution of the one or more operations and/or algorithms will access the information stored in the secondary memory module during the synchronization of the secondary memory module;

applying an image to the primary memory module while the primary mount point points to the secondary module; and adjusting the file system, subsequent to the application of the image to the primary memory module, such that the primary mount point points to the primary memory module so that the ongoing execution of the one or more operations and/or algorithms will access the information in the primary memory module during the application of the image to the primary memory module.

10. The method of claim 9, wherein synchronizing the secondary memory module to the primary memory module comprises causing a copy of the information that is stored in the primary memory module and used in the ongoing execution of the one or more operations and/or algorithms to be stored in the secondary memory module.

11. The method of claim 10, wherein the invention that is stored in the secondary memory module comprises one or more of a software kernel module, a driver, or a configuration file.

12. The method of claim 9, wherein the method further comprises mounting a secondary memory module to the file system at a secondary mount point prior to imaging the primary memory module.

13. The method of claim 9, wherein applying an image to the primary memory module comprises recording information associated with the image over information already stored in the primary memory module module.

14. The method of claim 9, further comprising taking an image of the primary memory module at a previous point in time.

15. The method of claim 14, wherein applying the image to the primary memory module comprises applying the image of the primary memory module that was taken at the previous point in time.

16. The method of claim 15, wherein applying the image to the primary memory module comprises storing the image of the primary memory module that was taken at the previous point in time over information currently stored in the primary memory module.

17. The method of claim 9, wherein the primary memory module comprises a hard drive.

18. The method of claim 9, wherein the secondary memory module comprises RAM.

* * * * *